United States Patent
Kluge et al.

(10) Patent No.: US 9,891,062 B2
(45) Date of Patent: Feb. 13, 2018

(54) SYSTEM FOR ESTIMATING A CRUISING RANGE OF A VEHICLE

(71) Applicant: Harman Becker Automotive Systems GmbH, Karlsbad (DE)

(72) Inventors: Sebastian Kluge, Munich (DE); Hans-Peter Engelhardt, Unterschleissheim (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 549 days.

(21) Appl. No.: 13/864,032

(22) Filed: Apr. 16, 2013

(65) Prior Publication Data

US 2013/0282272 A1    Oct. 24, 2013

(30) Foreign Application Priority Data

Apr. 18, 2012   (EP) ..................... 12164556

(51) Int. Cl.
*G01C 21/00*    (2006.01)
*G01C 21/34*    (2006.01)

(52) U.S. Cl.
CPC ............................. *G01C 21/3469* (2013.01)

(58) Field of Classification Search
CPC ........ G01C 21/00; G01C 21/26; G01C 21/34; G01C 21/3407; G01C 21/3446; G01C 21/3453; G01C 21/3461; G01C 21/3469; G01C 21/3476; G01C 21/3492; G01C 21/367; G01C 21/3697; G01C 21/30241
See application file for complete search history.

(56) References Cited

U.S. PATENT DOCUMENTS

| 5,285,391 A * | 2/1994 | Smith et al. ................. 701/533 |
| 2003/0006914 A1* | 1/2003 | Todoriki et al. ............. 340/995 |
| 2011/0238457 A1* | 9/2011 | Mason et al. ................ 705/7.14 |

FOREIGN PATENT DOCUMENTS

| CN | 101645200 A1 | 2/2010 |
| CN | 101681558 A1 | 3/2010 |
| CN | 102328658 A1 | 1/2012 |
| WO | WO 2011/029562 A1 | 3/2011 |
| WO | WO 2012089279 A1 * | 7/2012 |

OTHER PUBLICATIONS

European Search Report, issued in European Patent Application No. 12164556.8, dated Sep. 10, 2012, pp. 1-4.

* cited by examiner

*Primary Examiner* — Jelani Smith
(74) *Attorney, Agent, or Firm* — Artegis Law Group, LLP

(57) ABSTRACT

A navigation system may estimate a cruising range of a vehicle by performing a road network search. Digital map data that includes a set of road segments, where each road segment in the set can be associated with a hierarchy class and an elevation, may be retrieved. A road segment-specific weighting factor can be calculated for the road segments. The weighting factor can be calculated dependent on a distance of the specific road segment to a current location of the vehicle and on the elevation of the specific road segment. The road segments are selectively discarded by the navigation system based on the weighting factor and the associated hierarchy class to create a selected set of road segments. The road network search expands route links for the selected set of road segments based on an associated estimated energy consumption of the vehicle travelling along the route links.

16 Claims, 6 Drawing Sheets

SYSTEM FOR ESTIMATING A CRUISING RANGE OF A VEHICLE

PRIORITY CLAIM

This application claims the benefit of priority from European Patent Application No. 12 164 556.8, filed Apr. 18, 2012, which is incorporated by reference.

BACKGROUND OF THE INVENTION

Technical Field

Various embodiments relate to a system for performing a road network search for a vehicle navigation, and estimating a cruising range of a vehicle.

Related Art

Navigation systems may be used to determine a present location of a user. In addition, navigation systems can provide instructions to travel between different geographic locations. When a route to a destination is selected, the distance to travel, the time of arrival and other parameters can also be provided by the system. Navigation systems may also provide different routes based on different parameters, such as shortest route, fastest route, avoiding toll roads, and other techniques for calculating a particular route.

SUMMARY

A navigation system can estimate a cruising range of a vehicle. The navigation system may include a positioning unit, a storage unit, and a navigation unit. The position unit can determine a current location of the vehicle. The storage unit is configured to store digital map data in a vicinity of the current location, the digital map data may include a set of road segments. Each of the road segments may be associated with a hierarchy class and an elevation.

The navigation unit may be configured to retrieve the digital map data from the storage unit. In addition, the navigation unit may be configured to calculate a road segment-specific weighting factor for each of the road segments. The weighting factor may be calculated based on a distance from a specific road segment to the current location, and based on the elevation of the specific road segment. The navigation unit further configured to selectively discard road segments from the set of road segments, based on the weighting factor and the associated hierarchy class, to obtain an updated set of road segments. The navigation unit further configured to perform a road network search by expansion of route links based on the updated set of road segments. The road network search by the navigation system expands the route links based on an associated projected energy consumption of the vehicle travelling along the route link. In addition, the navigation unit is further configured to determine a reachability of a plurality of road segments based on an available energy and the energy consumption necessary to reach each road segment of the plurality of road segments along the expanded route links.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the system. Moreover, in the figures, like referenced numerals designate corresponding parts throughout the different views.

DETAILED DESCRIPTION OF THE PREFERRED EMBODIMENTS

Figure 1:
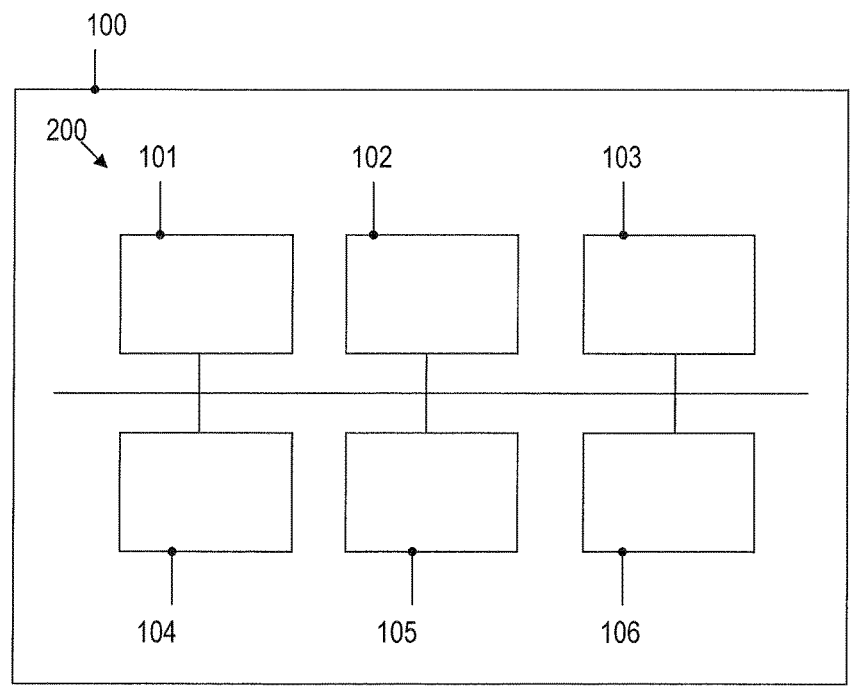
FIG. 1 is a schematic representation of an example of the system for estimating a cruising range of a vehicle.

The functionality of navigation units in vehicles can include estimating a cruising range of the vehicle, such as determine the most remote geographical locations still being reachable by the vehicle given the presently available amount of fuel or energy or within a given maximum time. In particular, cars powered by conventional fuel provide a comparably large amount of energy storage and therefore are capable of travelling larger distances, (can have a comparably larger cruising range); while vehicles powered by alternative energies, such as hydrogen-powered cars or hybrid cars or electric cars, may have a comparably smaller cruising range. For such scenarios, a particularly accurate estimation of the cruising range can be desired in order to accurately predict whether a certain destination is reachable without refueling or when refueling is necessary.

The cruising range of a vehicle typically is dependent on numerous different parameters which, in particular, may be subject to time-dependence. For example, the amount of available energy typically decreases with increasing travel time. Also, traffic conditions, which influence the cruising range, may change. For example, traffic congestion may reduce the cruising range. Importantly, also the present location of the vehicle may change overtime thereby changing the cruising range. Therefore, in order to provide an accurate cruising range at all times, frequent updating of a previously calculated cruising range may become necessary.

However, the determination of a cruising range can be computationally expensive, such as by requiring a large amount of computational resources. Therefore, a rate of updating of the cruising range may be limited due to a limited amount of computational resources. Accordingly, techniques can attempt to provide a frequently updated and accurate cruising range while, at the same time, reducing the computational resources needed for the determining and updating.

For example, a cruising range calculation for a plurality of roads can be performed, where the roads are dividable into multiple hierarchy classes. In this example, the cruising ranges can be calculated based on roads belonging to a certain class, such as a first hierarchy class. WO 2011/029562 A1 describes an example technique in this regard.

Therefore, techniques for estimating a cruising range without simplification of a road network, or with only slight simplification of a road network, can consume a large amount of computational resources. In addition, techniques for estimating the cruising range selectively by considering, for example, different hierarchy classes, can provide only an inaccurate approximation due to the simplification of a road network being based on the hierarchy classes of road segments forming the road network. Accordingly, certain road segments may be estimated to be reachable while they are indeed not reachable; while other road segments may be estimated to be not reachable, while instead they may be reachable. It is possible that from such a scenario problematic situations can arise where, for example, the vehicle ceases operation due to lack of energy or fuel before reaching a location that was previously estimated as reachable due to being determined as situated within the cruising range.

As described herein, a navigation system for estimating a cruising range of a vehicle can perform a road network search for a vehicle navigation that is accurate and computationally efficient. During operation the navigation system can determine a current location of the vehicle and retrieve digital map data in a vicinity of the current location. The digital map data can include a set of road segments. Each of the road segments can be associated with a hierarchy class and an elevation. The navigation system can also calculate a road segment-specific weighting factor for the road segments. For each specific road segment the weighting factor is calculated dependent on a distance between the specific road segment and the current location. Calculation of the weighting factor can be further dependent on the elevation of the specific road segment. The navigation system can also selectively discard road segments from the set of road segments based on the weighting factor and the associated hierarchy class in order to obtain an updated set of road segments. The navigation system can also perform a road network search by expanding route links based on the updated set of road segments.

It may be possible for the navigation system to subsequently employ the road network search to estimate a cruising range. In such a case, the road network search may expand the route links based on an associated projected energy consumption of the vehicle travelling along the route link.

The road segments may be associated with a starting point of given geographical location (xy coordinates, for example latitude and longitude) and an endpoint of given geographical location. The start and endpoints can also be referred to as nodes. By selectively discarding the road segments from the set of road segments, such as thinning out a road network of the digital map data, the updated set of road segments may contain a smaller number of road segments if compared to the set of road segments as originally retrieved. Because there are fewer road segments to consider for the road network search, the road network search may be performed by the navigation system using less computational resources and/or may be performed faster. For the road network search the road segments may be associated with costs. The costs may correspond to travel time and/or travel distance and/or fuel or energy consumption necessary to travel along the respective road segment.

The elevation may be stored in the digital map data for each of the road segments, for example an average elevation or an elevation of bounding nodes (starting point and end point) of the road segment. In other examples, it may also be possible that the elevation is retrieved from a digital terrain model providing the elevation for a geographical area. Then, the elevation of the road segments may, for example, be derived from digital terrain model based on the geographical location of the road segments.

It may also be possible to base selective discarding of road segments on the height or elevation difference within the road segment. For example, those road segments having only a comparably smaller height or elevation difference between two limiting nodes, such as a start node and an endpoint node of a road segment, may not be discarded. By selectively discarding road segments based not only on the associated hierarchy classes and/or the height (elevation) difference of the specific road segment (such as the road segment of the set of road segments which a given weighting factor relates to), but also based on the weighting factor (which may in turn depend on the distance of the specific road segment to the current location of the vehicle and the elevation of the specific road segment), the accuracy of the road network search may be not degraded significantly due to the thinning out of the road network. In other words, those road segments may be discarded which are unlikely to be part of a navigation route of the vehicle based on energy consumption and/or travel time.

The weighting factor may be, for example, an analytical expression of the distance to the current location and of the elevation of the specific road segment. In such a case it may be possible to selectively discard, based on the weighting factor, those specific road segments which have a longer distance to the current location, and which have a small elevation compared to a current elevation of the vehicle. Thereby, it may be possible to perform an accurate road network search in a close vicinity of the current location, which may be beneficial in order to accurately determine the accessibility of certain road segments having a high hierarchy. For example, a high hierarchy may represent those road segments corresponding to at least one of higher speed, higher capacity or higher through traffic. In other words, in the close vicinity of the current location, roads having a low hierarchy, such as local roads, but serving possibly as a feeder road to roads of higher hierarchy, such as highways or express roads, are less likely to be selectively discarded due to the respective weighting factor. Therefore, the accuracy of the road network search is not negatively influenced by discarding of important feeder roads, possibly having a lower hierarchy class.

The digital map data may be retrieved from a digital map database, the digital map database can include a hierarchical network where different layers corresponding to different levels of abstraction and/or different levels of detail included in the road segments. The hierarchy class of the specific road segment may be derived from a hierarchy of the layer or level of the hierarchical network which the specific road segment is included in.

In particular, different layers may exist which provide a different level of abstraction and/or a different level of detail of the road network. Therefore, road segments included in a given layer may be associated with a particular hierarchy class. For example, certain road segments, such as local roads or feeder roads, may only be included in those layers corresponding to a low level of abstraction. Also it may be possible that a physical road may be represented in the digital map data by a smaller (larger) number of road segments in those layers corresponding to a smaller (larger) level of detail.

In this regard, the selective discarding of road segments may correspond to discarding those road segments that are included in a given layer and possibly in all layers of lower level of abstraction/higher level of detail. In particular, for a given weighting factor, all road segments may be discarded which do not belong to a specific layer. In other words, depending on the weighting factor, the road network search may be performed using the road segments of a specific layer of the hierarchical network.

The weighting factor being determined based on the elevation of the specific road segment may decrease the likelihood of selectively discarding those road segments which have a comparably high elevation, in particular compared to the current elevation of the vehicle. When employing the method of performing the road network search according to the presently discussed aspects for estimating the cruising range, it may be desired to consider those roads having a large elevation for the road network search. This is because the energy or fuel consumption may be strongly dependent on the elevation. In an illustrative scenario where the weighting factor is not dependent on the elevation of the specific road segment, a misleading road network search and follow-up cruising range estimation may occur. For example, using the navigation system a certain road may be estimated as not being reachable due to the large amount of potential energy necessary to reach the certain road via a mountain path; however, a certain road in the valley at the end of the mountain pass road is indeed reachable by using circumnavigation of the mountain pass road. Absent the navigation system, a driver might be led to using the mountain pass road which is apparently shorter, but which may cause the vehicle to break down without fuel halfway between the current location and the target location in the valley at the end of the mountain pass road. However, by the navigation system accurately thinning out the road network, and also considering the elevation of the specific road segments, such a situation may be avoided.

The navigation system may also determine an approximate cruising range and determine a set of geographical locations based on the approximate cruising range. The weighting factor may further be determined based on a distance of the specific road segment to the set of geographical locations. For example, the approximate cruising range may be based on an available energy of the vehicle, on a projected energy consumption of the vehicle, and on the current location. The projected energy consumption may be determined from an averaged previous energy consumption or from a predefined value. Relying solely on those parameters, it may already be possible to determine the approximate cruising range. However, it may be possible to consider further parameters.

In particular, determining the approximate cruising range may be independent of a geographic direction with respect to the current location. In other words, the approximate cruising range may correspond to a cruising radius which is centered around the current location of the vehicle and/or may be determined irrespective of the road network. In particular, the approximate cruising range may be determined using only a small amount of computational resources, and thus may be determined quickly and/or frequently.

For example, the set of geographical locations may be coincident with the cruising radius as set forth above. The set of geographical locations may also be in a predefined relationship with the cruising radius, for example if shifted by a predefined amount towards closer distances to the current location. In any case, the set of geographical locations may be determined based on the approximate cruising range.

The navigation system may also selectively discard the road segments, such as by thinning out the road network, to a lesser extent in areas close to the approximate limit of the cruising range. In other words, in areas where it is roughly estimated that the amount of fuel or energy runs low, it may be possible to more accurately perform the road network search, and subsequently perform an estimation of a cruising range, by selectively discarding the road segments from the set of road segments in such an area to a lesser degree. This may allow for more accurate estimation of the cruising range.

Moreover, the navigation system may perform the road network search by determination of one or more certain locations as being relevant for vehicle navigation. Where such certain locations are identified, the weighting factor can be further determined dependent on a distance of the specific road segment to the certain location. There may exist a number of types of certain locations which are relevant for vehicle navigation, such as if a planned route of the vehicle is known. Examples of certain locations include target locations such as the destination of a route, or traffic obstructions, or points of interests such as gas stations or parking lots, or any other location. In such a case, it may be desired to determine the weighting factor based also on such certain locations.

In the case of a traffic obstruction, for example a road closure or a traffic jam, it is likely that a detour avoiding the obstructed road may be followed. In order to accurately perform the road network search in such a scenario, it may be desired to consider such an event when determining the weighting factor and, as a result, reduce or increase, depending on the situation, the degree of thinning out of the road network in the vicinity of the certain location. Another example could be a time-dependent, such as a day- or weekday dependent, road-closure. For example, certain roads or even road lanes may be subject to traffic restrictions depending on the time. An example would be high-occupancy-vehicle (HOV) lanes. It may be desired to set the weighting factor accordingly in order to ensure an accurate road network search. This may subsequently allow a more accurate determination of the cruising range of the vehicle.

The navigation system may also determine a current elevation of the vehicle, and calculation of the weighting factor may also be dependent on a relative elevation difference of the elevation of the specific road segment with respect to the current elevation. In particular, in view of fuel or energy consumption, such as for estimating of the cruising range, the relative elevation difference that the vehicle needs to overcome may be particularly relevant. In such a case it may be desired to base the selective discarding of road segments on the relative elevation difference. In particular, the weighting factor may be determined differently for positive and negative elevation differences. For example, if the elevation difference between the specific road segment and the current location is a positive number, for example the specific road segment has a higher absolute altitude than the current location, the weighting factor may be calculated in dependence on that elevation difference. On the other hand, the weighting factor may not be dependent or may have a qualitatively opposing dependency if the relative elevation difference between the specific road segment and the current location is a negative number, such as where the specific road segment has a lower absolute altitude than the current location. For example, in this scenario, the specific road segment may have an altitude of 700 meters above sea-level, while the current location of the vehicle has an altitude of 1200 meters above sea-level. In such a case, the weighting factor may be determined accordingly as previously set forth. For example, the current elevation may be obtained from a Global Positioning System, possibly in combination with the current location and the digital map data. For example, a digital terrain model may be employed.

The selective discarding of road segments may include discarding those road segments of the set of road segments associated with a hierarchy class corresponding to at least one of a smaller travel velocity, a smaller traffic capacity, or a reduced through traffic if compared to a threshold hierarchy class. Different classifications of road segments into hierarchy classes are known and standardization exists. For example, it may be possible to rely on such a standardized hierarchy classification for the digital map data. In such a classification, high or large hierarchies are attributed to those road segments which allow for fast travelling, such as, highways or express ways. Low or small hierarchies are associated with local roads or feeder roads. Such local or feeder roads typically have a smaller travel velocity, a smaller traffic capacity, and a reduced through traffic if compared to the high hierarchy class roads. Then those roads which are estimated to be less likely to be part of a route followed by the vehicle may be discarded by the navigation system, said estimation being based on the determined weighting factor. For example, when travelling long distances, it is less likely that local roads of low hierarchy will be used; rather, it is likely that a preferred route will follow high hierarchy roads such as highways or freeways.

In particular, in such a case the threshold hierarchy class may be dependent on the weighting factor. In a specific illustrating scenario, the road segments of the digital map data may be grouped into four hierarchy classes relating to: 1=local roads, 2=collectors, 3=arterials, 4=freeways. In case of a comparably large weighting factor, the threshold hierarchy class may be reduced (such as from 3 to 2), thereby resulting in the selective discarding of only a comparably smaller number of road segments having comparably smaller hierarchy classes (such as only roads with hierarchy class 1 and 2 instead of roads with hierarchy classes 1 and 2 and 3). Such dependencies of the weighting factor, the hierarchy classes, and the selectively discarding are not to be construed as being limited as they are merely illustrative. It should be understood that any dependency and relationship may be used based on the particular requirements imposed by the road network search and/or a subsequent cruising range estimation. In a case where the hierarchy class is derived from the hierarchical network, the threshold hierarchy class may correspond to a particular layer.

The calculation of the weighting factor for a specific road segment may have a same sign of dependency if compared to a weighting factor determined for a reference road segment when a predetermined situation is present. For example, the predetermined situation may include one or more of the following situations: the specific road segment has a smaller distance to the current location than the reference road segment; and the specific road segment has a larger positive elevation difference to the current location than the reference road segment. Here the relative elevation difference may be, in other words, the difference in elevation of the respective road segment with respect to the current location. A positive elevation difference may correspond to the specific road segment having a larger absolute altitude than the current location.

A weighting factor having the same sign of dependency for smaller distances to the current location and larger elevation differences with respect to the current location may result in the weighting factor being either increased or decreased for, both, smaller distances, as well as larger elevation differences. In other words, if the weighting factor is, for example, an analytical function of the distance to the current location and the relative elevation difference, the derivation of this analytical function with respect to the distance may have the same sign as the derivation of this analytical function with respect to the elevation difference.

This may have the effect that the influence of an increased distance to the current location on the weighting factor is qualitatively the same as the influence of an increased elevation difference on the weighting factor. However, it should be understood that while the qualitative dependencies may be the same, quantitatively different degrees or strengths of dependency may exist. Depending on the articular system requirements, such quantitative dependencies may be subject to system layout and fine tuning and may be dependent on various parameters.

In the same manner, the determining of the weighting factor for the specific road segment may have the same sign of dependency if compared to the weighting factor determined for a reference road segment for the predetermined situation that includes one or more of: the specific road segment has a smaller distance to a certain location that is relevant for the vehicle navigation than the reference road segment; and the specific road segment has a smaller distance to a set of geographical locations than the reference road segment, where the set of geographical locations may be determined based on an approximate cruising range. For example, the certain location may be a traffic jam or a road closure, a fuel station, a parking lot, or any other location related to traffic conditions and/or one or more points of interest.

As set forth above, the road network search may be performed by the navigation system in view of estimating a cruising range.

According to a further aspect, the navigation system may perform a road network search for a vehicle navigation. The navigation system can determine a current location of the vehicle and retrieve digital map data in a vicinity of the current location, the digital map data may include a number of layers corresponding to different hierarchy levels of a hierarchical network and each layer may include a set of road segments, the digital map data may further indicate a spatially resolved elevation. The navigation system may also calculate a spatially resolved weighting factor for a geographical area in the vicinity of the current location, the weighting factor may be dependent on a distance from the geographical area to the current location, and on the elevation of the geographical area. The system may also selectively choose, in the geographical area, based on the weighting factor, the set of road segments included in a given layer of the number of layers, and perform the road network search by expanding route links based on the chosen set of road segments.

For example, standardized database formats of the digital map data can provide the hierarchical network. Different layers may correspond to different levels of abstraction and/or different levels of detail. For example, particular road segments may not be included in a first layer, while the particular road segments are included in a second layer. Also, a certain physical road may be represented in the digital map data by a larger or smaller number of road segments, depending on the layer.

In various examples, the navigation system may also estimate the cruising range of a vehicle. The navigation system may perform a road network search according to the previously described performance of a road network search for vehicle navigation, wherein the road network search expands the route links based on an associated projected energy consumption of the vehicle travelling along the route link. The navigation system may also determine a reachability of a number of different road segments based on an available energy and the projected energy consumption necessary to reach each road segment of the plurality of road segments. In addition, the navigation system may estimate the cruising range based on the determined reachability of the road segments.

In other words, the road network search by the navigation system may operate based on costs associated with a route link, where the costs are dependent on the energy consumption of the vehicle. Such energy consumption costs may be determined from vehicle-specific, driver-specific, environmental, and route-specific parameters, including also dynamically changing information such as traffic information. Such parameters may include, for example, received information on dynamic route properties, traffic congestion, traffic information, time of the day, weather conditions, outside temperature, vehicle type, motor type, energy type, number of passengers in the vehicle, average previous energy consumption, and average previous velocity. For example, if a road segment covers a larger elevation difference, the associated consumption costs may be higher than for a road segment covering no elevation difference. At the same time, longer road segments may have higher associated consumption costs than shorter road segments. Road segments in crowded cities may have higher associated consumption costs than road segments in remote locations. Also, road segments for which a traffic jam is reported may have higher associated consumption costs than road segments for which no traffic obstruction is reported. Such examples are not to be construed as being limiting as they are merely illustrative. Different dependencies may apply. In general, known techniques may be used to determine energy consumption based on such parameters.

By estimating the cruising range using the navigation system and the methods as presently discussed, on the one hand, a thinned out road network may be used such that the computational complexity and the required computational resources are comparably low, and, on the other hand, a high accuracy in the estimated cruising range may be obtained.

A given road segment among the road segments for which the road network search expands a plurality of orientated route links may be determined as being not reachable if all expanded route links are not reachable. Namely, in certain scenarios, road segments may be associated with two or more route links having a certain orientation. An example illustrating this would be a highway road having separate opposite driving lanes, such as a northbound lane and a southbound lane. In such a scenario, a situation may occur where one of two route links is determined as being reachable, such as the northbound route link. For example, the driving lane of the highway pointing away from the current location may be determined as being reachable, while the driving lane of the highway pointing towards the current location of the vehicle may be determined as not being reachable. This may occur when a detour, for example via a highway exit/entrance, needs to be followed by the vehicle in order to reach the driving lane pointing towards the current location. In the example, the driver may be required to travel northbound for a certain distance, take the exit to turn around, and travel back southbound to reach the southbound route link of the given road segment. In such a case it may be desired to determine the given road segment as being reachable—even though one of the expanded route links is not reachable.

According to various examples, the navigation system may perform other methods for estimating the cruising range of a vehicle. For example, the navigation system can perform a road network search according to the techniques for performing a road network search for vehicle navigation as previously discussed, wherein the road network search expands the route links based on an associated travel time of the vehicle for travelling along the route link. The navigation system may also determine a reachability of a plurality of road segments based on an available amount of time and the amount of travel time necessary to reach each road segment of the plurality of road segments, and estimate the cruising range based on the determined reachability of the plurality of road segments.

In such an example, the road network search may operate based on costs associated with a route link, where the costs are dependent on the travel time of the vehicle along a given route link. This may allow the navigation system to determine the cruising range which corresponds to, for example road segments which are reachable within a given time. This may have the effect that a user may easily see which locations, such as points of interest, landmarks, hospitals, pharmacies, police stations, and any other destinations, are reachable within a given time period.

The navigation system may also estimate a travel route to a travel destination. The navigation system can perform a road network search according to the previously discussed method of performing a road network search for vehicle navigation. The road network search includes the navigation system expanding route links based on associated travel time and/or travel distance of the vehicle travelling along the route link. The navigation system can also determine a travel route to the travel destination based on the expanded route links. The travel route is determined by the navigation system by minimizing travel time and/or travel distance.

For such a method of estimating the travel route, navigation, such as turn-by-turn navigation, to a destination, such as a target location, may be obtained in a computationally efficient manner. For example, the method may yield the shortest route or may yield the quickest route. In other words, the road network search may expand route links according to costs associated with travel time and/or travel distance.

According to a further aspect, a navigation system for estimating a cruising range of a vehicle is provided. The navigation system may include a positioning unit configured to determine a current location, and a storage unit configured to store digital map data in a vicinity of the current location. The digital map data may include a set of road segments, wherein each road segment is associated with a hierarchy class and an elevation. The system may further include a navigation unit configured to estimate the cruising range by retrieving the digital map data from the storage unit, and calculating a road segment-specific weighting factor for the road segments. The weighting factor may be calculated dependent on a distance from the specific road segment to the current location, and being further dependent on the elevation of the specific road segment. The navigation unit is further configured to selectively discard the road segments from the set of road segments based on the weighting factor and on the associated hierarchy class in order to obtain an updated set of road segments. In addition, the navigation unit can perform the road network search by expanding route links based on the updated set of road segments. The road network search by the navigation unit can expand the route links based on an associated projected energy consumption of the vehicle for travelling on the route link, and determine a reachability of a plurality of road segments based on an available energy and the energy consumption necessary to reach each road segment of the plurality of road segments along the expanded route links. The navigation unit is further configured to estimate the cruising range based on the determined reachability of the plurality of road segments.

The navigation system may also include a user interface, wherein the navigation system is configured to determine the weighting factor dependent on a user input received from the user interface. For example, it may be possible that a user manually specifies the degree of thinning out of the road segment network, such as by determination of how many of the road segments are selectively discarded. Such a user input may be explicit or implicit. In particular, it may be possible that a user may implicitly influence the weighting factor via the input. In an example, the estimated cruising range may be displayed as a range polygon on a display of the system. In such a case a user may zoom in or zoom out, such as by magnifying or demagnifying, such a graphical representation of the cruising range. In case the user magnifies a certain region of the visualized cruising range, it may be possible to determine the weighting factor such that selectively for this magnified region the road segment network is thinned out to a lesser, or smaller degree, for example, a hierarchy class threshold marking the upper limit of selectively discarded hierarchy classes of road segments may be increased. In other examples the weighting factor can be determined independently of the magnification of the map view. In addition, in other examples it may be possible to solely alter the graphical representation, such as the cruising range by zooming, without altering the weighting factor.

The navigation unit may be further configured to update the estimation of the cruising range based on predefined conditions, wherein the weighting factor is determined dependent on a time period between two subsequent updates of the estimating of the cruising range. Such predefined conditions may be a fixed update frequency, an incremental change of the available fuel or energy, a certain travelled distance, a change in the parameters influencing the fuel consumptions, such as a new traffic information message or the like. When selectively discarding based on the weighting factor, the weighting factor may have an influence on the required computational resources for updating the cruising range. If the cruising range needs to be updated very often, such as if there is a short time period between two subsequent updates of the cruising range, it may be desirable to reduce the computational resources needed to perform the update. In such a case the weighting factor may be determined accordingly.

It is to be understood that the features mentioned above and features yet to be explained below can be used not only in the respective combinations indicated, but also in other combinations or in isolation. Features of the abovementioned aspects and examples may be combined with each other in other examples.

In the following, techniques will be explained with reference to the Figures which can be used in order to selectively discard road segments from a road segment network in order to efficiently perform a road network search. Efficiently performing a road network search may have particular application in methods and techniques for estimating a cruising range. While the techniques of selectively discarding and performing the road network search are primarily discussed with respect to an application for the estimation of the cruising range, it should be understood, however, that other fields of application are possible. For example, the road network search employing selectively discarded road segments based on a weighting factor may also be employed when calculating a short and/or fast travel route and/or energy-efficient route to a target location.

FIG. 1 shows an example navigation system 200 for estimating a cruising range of a vehicle 100. Vehicle 100 may be a car driven by conventional fuel, such as gas or diesel, or may be a hybrid car or electric car. The system 200 is capable of performing a road network search for a vehicle navigation based on an updated set of road segments, such as a set of road segments from which road segments have been selectively discarded based on a weighting factor. The system 200 may be part of a vehicle 100. The system 200 includes a positioning unit 101 which is configured for determining a current location and/or current elevation of the vehicle 100, for example via a global positioning system (GPS) or a cellular network or vehicle odometry data.

A storage unit 103 is provided for storing digital map data 2. The storage unit 103 may include the digital map data 2 stored in a database. The database may have a predefined structure and organization. The digital map data 2 includes road segments and other map data, such as geographical information, landscape information (such as cities, rivers, lakes, labels, points of interest, gas stations), and the like. The road segments of the stored road segment network are each associated with a hierarchy class and an elevation. The elevation may, for example, be specified as an elevation over sea level. The hierarchy class may be a standardized classification of the specific road segments in view of parameters such as travel velocity, travel capacity, and through traffic. For example, the hierarchy classification may be implemented using integer numbers between 1 and 8, where small numbers, such as low hierarchies, correspond to local roads or feeder roads and larger numbers, such as high hierarchies, correspond to highways or freeways. Other hierarchy classifications are possible. In particular, the hierarchy class of a road segment can be correlated with travel time and/or average velocity along a road segment in a road network search. The hierarchy classifications can be used in order to calculate the quickest route between an origin and a target.

Also, the predefined structure/organizational hierarchy of the database of the digital map data 2 may provide another example of the hierarchy class of the different road segments of the digital map data 2. Namely, the digital map data 2 may include different layers of a hierarchical network. Different layers can correspond to different levels of abstractions and/or levels of detail of the road network. For example, a certain (high) layer may include only long distance roads, while another (low) layer may comprise the long distance roads and local roads. It may be possible to obtain the hierarchy classification based on such layer information. Such a scenario is discussed with respect to FIG. 9.

A navigation unit 102 is provided which is, for example, directly coupled to the storage unit 103 or, as indicated in FIG. 1, via a communication link, such as a vehicle bus system (such as "CAN" or "MOST" or "FlexRay" bus system or the like). The navigation unit 102 can retrieve the digital map data 2 from the storage unit 103. The navigation unit 102 is configured to perform a road network search based on the digital map data 2 by expanding route links along the road segments. Various methods of performing the road network search are known, for example the method according to Dijkstra or derived methods. Such methods of performing the road network search rely upon costs associated with each expanded route link. The costs can be defined in view of travel time along the road segment, in view of distance of the road segment, or also in view of energy consumption needed when travelling along a certain road segment. The road network search can be configured to yield a route being optimized with respect to the associated costs. For example, the route of minimized or minimum travel time, such as the fastest route; or the route of minimized or minimum travel distance, such as the shortest route; or the route with minimized or minimum energy consumption between the current location or another origin and the destination may be obtained. Such techniques are known to the skilled person such that there is no need to discuss further details in this context.

The navigation system may also include at least one computing unit. The computing unit may be included in the navigation unit and/or may be external to the navigation unit. The computing unit includes at least one processor, such as, for example, a central processing unit (CPU), a microcontroller (uC), or some combination of different or the same processors in communication with a memory. The processor may be a component in a variety of systems. The processor may be one or more general processors, digital signal processors, application specific integrated circuits, field programmable gate arrays, digital circuits, analog circuits, combinations thereof, or other now known or later developed devices for analyzing and processing data. The processor may implement a software program, such as code generated manually or programmed.

The term "unit" is defined to include one or more executable modules, at least some of which may be embodied in a computer readable storage medium as executable instructions. Accordingly, as described herein, units are defined to be software executable by the processor, such as a computer readable storage medium that may include instructions executable by the processor, a field programmable gate array (FPGA), and/or various devices, components, circuits, gates, circuit boards, and the like that are executable, directed, and/or controlled for performance by a processor.

The computing unit may also include and/or be in communication with a memory, of which at least a part may communicate via the bus. The memory may be a main memory, a static memory, or a dynamic memory. The memory may include, but is not limited to computer readable storage media such as various types of volatile and nonvolatile storage media, including but not limited to random access memory, read-only memory, programmable read-only memory, electrically programmable read-only memory, electrically erasable read-only memory, flash memory, magnetic tape or disk, optical media and the like. In one example, the memory may include a cache or random access memory for the processor. At least part of the memory may be separate from the processor, such as a cache memory of a processor, the system memory, or other memory for storage of data and/or instructions. The memory may include an external storage device for storing data and/or instructions. Examples include a hard drive, compact disc ("CD"), digital video disc ("DVD"), memory card, memory stick, floppy disc, universal serial bus ("USB") memory device, or any other device operative to store data. The memory is operable to store instructions executable by the processor. The functions, acts or tasks illustrated in the figures and/or described may be performed at least partially by the programmed processor executing the instructions stored in the memory. The functions, acts or tasks may be independent of the particular type of instructions set, storage media, processor or processing strategy and may be performed by software, hardware, integrated circuits, firmware, micro-code and the like, operating in combination. Likewise, processing strategies may include multiprocessing, multitasking, parallel processing and the like.

The memory may be a computer readable storage medium or machine readable medium and may include any non-transitory memory device that may include or store software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible storage medium upon which software is stored. The software may be electronically stored as an image or in another format (such as through an optical scan), then compiled, or interpreted or otherwise processed.

A display 105 is provided in the system 200. The display 200 may be any form of visual display device, such as a liquid crystal display (LCD), an organic light emitting diode (OLED), a flat panel display, a solid state display, a cathode ray tube (CRT), a projector, or other now known or later developed display device for outputting determined information. The display 200 may act as an interface for the user to see the functioning of the processor, or specifically as an interface with the software stored in the memory. The display 105 can, for example, be used in order to display outputs generated by the navigation unit 102. Such outputs can include a graphical representation of the digital map data 2, such as a map view, a graphical representation of a planned route, or a range polygon, such as a piecewise linear connection, or a spline, such as a piecewise cubic connection, or other form of outputs, related to an estimated cruising range of the vehicle.

The system furthermore includes a user interface 104 which allows user input and user output from and to a user, such as the driver of the vehicle 100. The input device may be a keypad, a keyboard, or a cursor control device, such as a mouse, or a joystick, touch screen display, remote control or any other device operative to interact with the system. For example, via the user interface 104, a user may specify a desired target location, may zoom in or zoom out of the map view, or may interact in any other way with the parameters and functions of the system 200. The user interface 104 may include buttons, voice control, gesture recognition, or any other mechanism, device, or technique that allows communication between the user and the system.

Furthermore, the system 200 includes a number of sensors 106 to sense parameters related to the vehicle, conditions external to the vehicle, conditions internal to the vehicle, and/or the navigation system 200. Such sensors may be able to, for example, sense fuel or energy available for powering the vehicle 100, sense the number of passengers in the vehicle 100, sense environmental parameters such as weather conditions or traffic conditions, and may, in general, sense any parameters related to a rate of fuel or energy consumption and an amount of available fuel or energy. In other words, the information of the sensors 106 may be used by the system 200 to perform estimation of the cruising range of the vehicle 100. In general, it may be possible to provide a wireless connection to a central service facility. The central service facility may, in one example, provide services regarding the estimation of the cruising range. For example, certain indications of traffic obstructions or particular relevant areas may be sent to the vehicle to be considered in the estimation.

Figure 2:
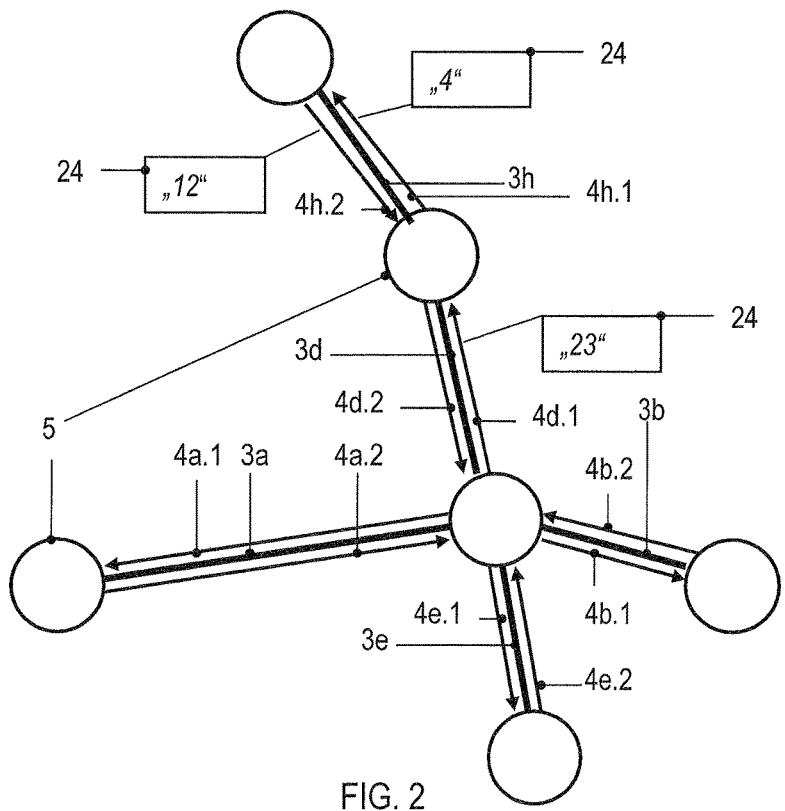
FIG. 2 is an example schematic illustration of road segments and route links

Details of the techniques of performing the road network search by means of the navigation unit 102 are schematically illustrated in the example of FIG. 2. In FIG. 2 an example of a number of road segments 3a, 3b, 3d, 3e, 3h are illustrated. The road segments expand between nodes 5 of defined geographical location. Various formats of display of the digital map data 2 containing the road segments 3a, 3b, 3d, 3e, 3h are known, either relying on the nodes 5 or the links between the nodes 5. The techniques for performing the road network search expand unidirectional or bidirectional links along the road segments 3a, 3b, 3d, 3e, 3h, such as between the respective nodes 5. Such route links 4a.1, 4a.2, 4b.1, 4b.2, 4d.1, 4d.2, 4e.1, 4e.2, 4h.1, 4h.2 are illustrated in FIG. 2 using arrows. For some of these route links, in FIG. 2 there are schematically illustrated associated energy consumption costs 24 as integer numbers. The consumption costs 24 relate, such as proportionally, to the amount of fuel or energy necessary to travel along the specific road segment by means of the respective route link. As can be seen, for example in the case of the road segment 3h, a road segment may comprise more than one respective route link, in the case of the road segment 3h, there are provided two opposing route links 4h.1, 4h.2, such as a northbound lane and a southbound lane of travel. The two route links 4h.1, 4h.2 relate to opposing connections between the delimiting nodes 5. For example, performing a road network search may result in a situation where the costs of reaching the road segment 3h coming from the road segment 3d are smaller than the costs for reaching the road segment 3h from the other direction. This is because the two route links 4h.1, 4h.2 may have different costs associated therewith, such as in the case of a height or elevation difference covered by the respective road segment.

When determining the reachability of a specific road segment the fuel or energy consumption necessary to reach the specific road segment may be determined based on the respective costs for a route obtained from the road network search. The reachability of the specific road segment may be determined based on the energy consumption and the available energy. If the available energy is not sufficient to reach the specific road segment by the optimized route (the route being optimized in view of energy consumption) then the specific road segment may be estimated as not being reachable; and vice versa.

In particular, if for the specific road segment a plurality of route links, for example orientated route links, exist, the road segment can be determined as not being reachable if all expanded route links are not reachable. In the case of the road segment 3h in FIG. 2, this would mean that in a scenario, where the route link 4h.1 is determined as being reachable, but the route link 4h.2 is determined as not being reachable, the road segment 3h is determined as being reachable.

If the reachability is determined for a number of road segments, the cruising range of the vehicle can be determined by considering the reachability of the road segments. For example, a range polygon may be provided which encircles or circumferes the cruising range, such as by identifying an outer boundary of the cruising range.

However, estimating the cruising range using techniques as set forth above may be computationally expensive. The navigation system may reduce the computational efforts needed to accurately estimate the cruising range of the vehicle by thinning out the network of road segments before performing the road network search. Then the road network search can expand a smaller number of route links, thereby saving computational resources. A road network search may be performed quicker by the navigation unit 102 which can allow more frequently updating the estimated cruising range, thereby increasing accuracy.

Figure 3:
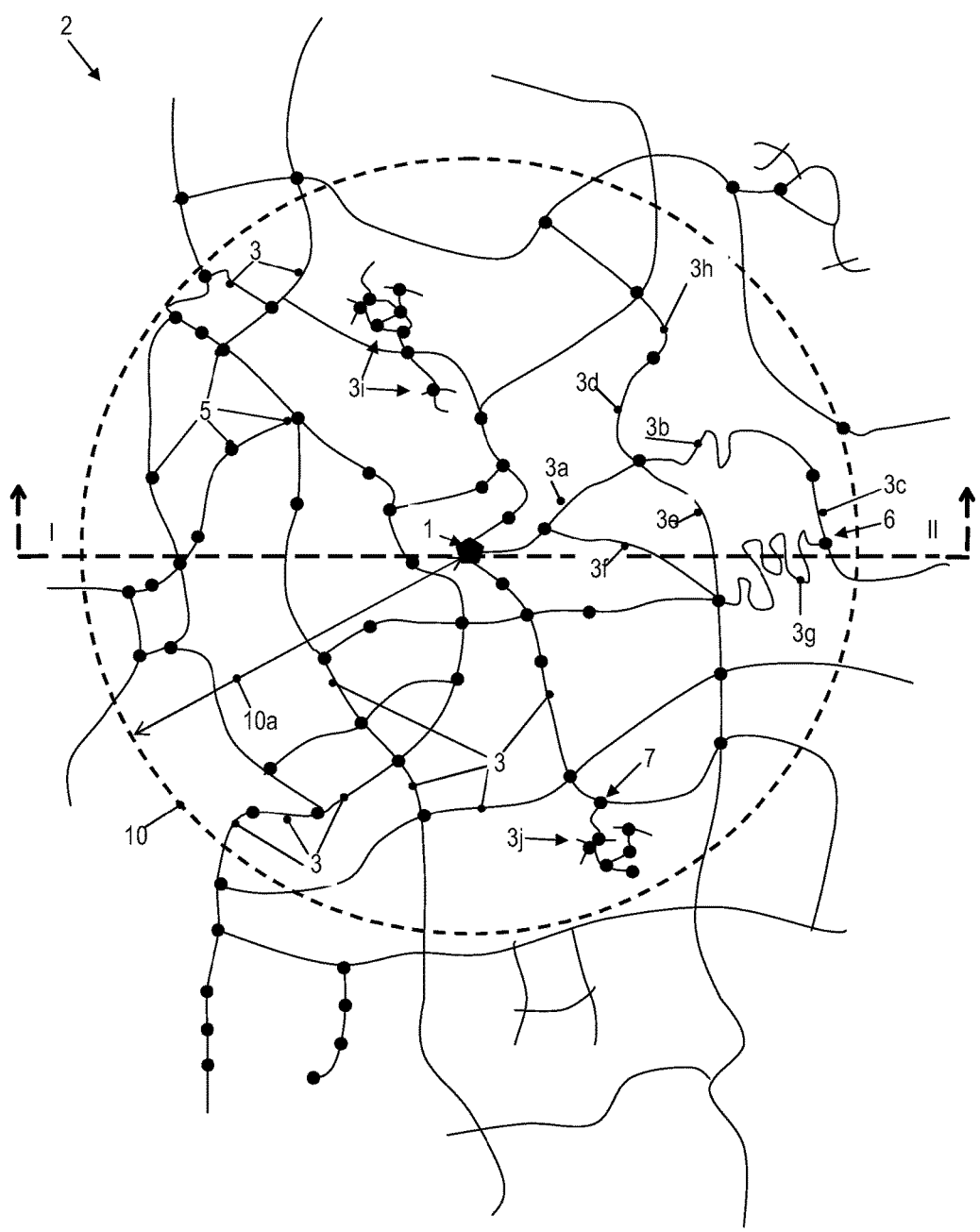
FIG. 3 illustrates an example road network search by expanding route links.

In FIG. 3, an example geographical representation, such as a map view, of the digital map data 2 as stored in the storage unit 103 of the system 200 is depicted. A number of road segments 3, 3a-3j are illustrated. The map view can be centered with respect to a current location 1 of the vehicle 100. Furthermore, a target location 6 is input, for example, by the user via the user interface 104 of the system 200 or by other means.

Illustrated in FIG. 3 is an approximated cruising range 10. The approximated cruising range can be a rough estimation of the distance 10A which the vehicle 100 is able to travel given the presently available fuel or energy. Such a rough estimation can be based on an amount of available fuel or energy of the vehicle 100 and on a projected energy consumption of the vehicle 100. For example, an average previous energy consumption can be used or a predefined value, such as a vehicle specific value. A distance or radius 10 can thus be readily calculated. However, the approximate cruising range 10 is determined independently of the digital map data 2, in particular of the road segment network, therefore the approximate cruising range 10 is independent of a geographic direction with respect to the current location 1. In other words, the approximate cruising range 10 forms a cruising radius in circular shape around the current location 1.

However, it should be understood that decisive for the calculation of the approximated cruising range 10 may be that the calculation occurs in a computationally efficient and inexpensive manner. If permissible under the circumstances, it may also be possible to consider the road segment network to some degree, possibly a limited degree corresponding to higher abstraction/lower detail when calculating the approximated cruising range. For example, highway or freeway roads may be considered or it may be taken into account that in densely populated urban areas the average fuel consumption is higher, etc. However, in general, the approximated cruising range may have a limited accuracy thereby saving computational efforts.

The number or amount of road segments 3, 3a-3j in FIG. 3 is comparably large. In order to more efficiently perform the road network search, it is possible to thin out the road segment network, by selectively discarding, for example, those road segments having a low probability of being contained in long distance routes, before expanding the route links. In this regard, the selective discarding can be based on the road hierarchy classes. It may also be possible to base the selective discarding on the height difference covered by the road segment. For example, those road segments having only a comparably smaller height difference between the two limiting nodes may not be discarded. Furthermore, when employing the performed road network search for estimating a cruising range, the selective discarding of the road segments 3, 3a-3j can be further based on a weighting factor. The weighting factor can consider various parameters as will be explained with respect to the following FIGS. 4 and 5.

Figure 4:
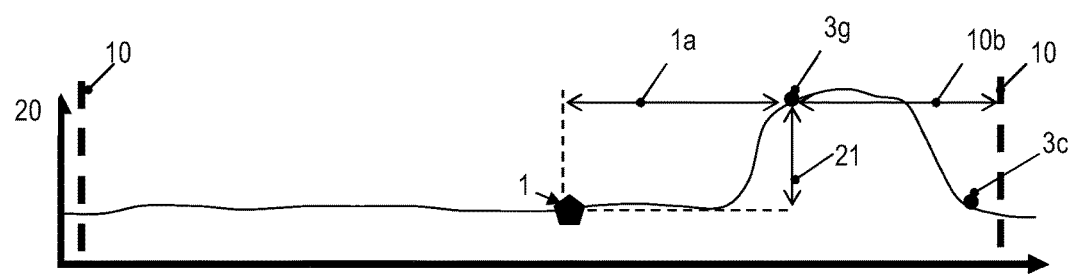
FIG. 4 schematically illustrates an example of distances and elevations of road segments with respect to each other and with respect to an approximate cruising range.

FIG. 4 is an example schematic view of the digital map data 2 along the line labelled I-II in FIG. 3. Plotted is an elevation 20 as a function at the position along the line I-II. As can be seen, the elevation 20 remains at an approximately constant value except in the vicinity of a specific road segment 3g having a certain distance 1a to the current location 1. In particular, there exists a relative elevation difference 21 between the specific road segment 3g and the current location 1. Furthermore, the specific road segment 3g has a certain distance 10b to the approximated cruising range and a distance 1a to the current location 1.

Figure 5:
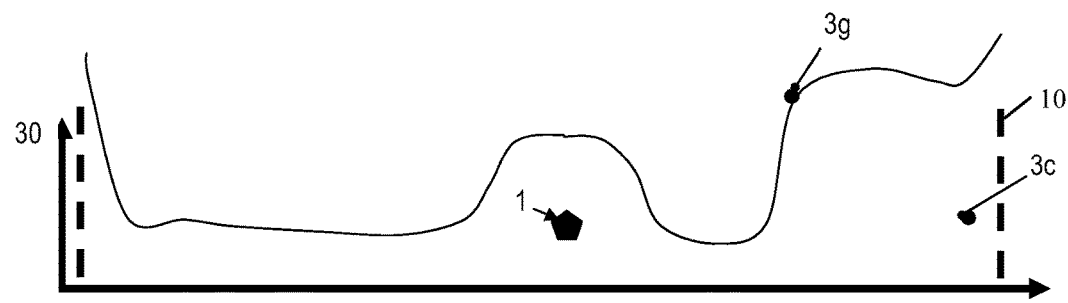
FIG. 5 illustrates an example of calculation of a weighting factor based on the distances and elevations of FIG. 4.

In FIG. 5, an example of a weighting factor 30 plotted as a function of the position along the line I-II of FIG. 3. As can be seen, the weighting factor 30 takes large values for positions close to the current location 1, as well as for positions close to the approximated cruising range 10. Furthermore, the weighting factor 30 takes large values for positions having a large elevation difference with respect to the current location, such as in particular for the specific road segment 3g. For example, the weighting factor 30 can be an analytical function of these parameters. Such an analytical function could be described by:

$$w = af(\Delta H) + bf(D_1) + cf(D_2) \qquad (1)$$

In Equation 1, w denotes the weighting factor 30, ΔH denotes the relative height difference 21 (FIG. 4), $D_1$ denotes the distance 1A between the specific road segment for which the weighting factor is calculated and the current location 1, and $D_2$ denotes the distance 10b between the specific road segment and the approximated cruising range. a, b, and c are parameters. For example, the weighting factor 30 can be calculated for specific road segments, such as individually for each of the road segments 3, and 3a-3j.

The relative magnitude of the parameters a, b, c with respect to each other may be subject to system design and fine tuning of the system 200. For example, the functions f may be linear functions, polynomial functions, or the like. The magnitude of the parameters a, b, c determines the strength of influence of the distance 1a, the elevation difference 21, and the distance 10b on the weighting factor 10. The values of the parameters a, b, c may influence the degree to which the road segment network is thinned out and thereby influence the computational efforts needed for the road network search.

It should be understood that other techniques exist for determining the weighting factor 30 rather than using techniques as described above. For example, a look-up table may be used. The examples given above are merely illustrative.

Figure 6:
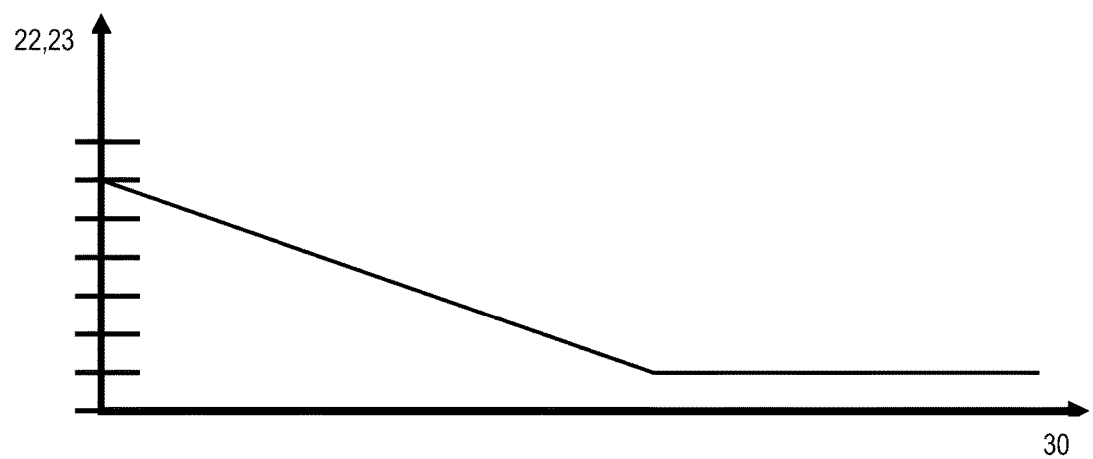
FIG. 6 illustrates an example of selectively discarding of road segments based on the weighting factor and associated hierarchy classes.

FIG. 6 illustrates an example of selective discarding of the road segments 3, 3a-3j in dependence of the weighting factor 30 of the specific road segment. Plotted in the example of FIG. 6 is a value of a threshold hierarchy class 23 (vertical axis) based on the values of all used hierarchy classes 22 as a function of the weighting factor 30. The threshold hierarchy class 23 is chosen to equal the hierarchy classes 22 as a function of the weighting factor 30. In the case of FIG. 6, the values of the hierarchy class 22 can take integer values of 1-8. For example, a value=1 may correspond to a local road with speed limit smaller than 30 km/h and a value=8 may correspond to a freeway with no speed limit. For example, when the weighting factor 30 is very small (as indicated in the left-hand side of FIG. 6), the threshold hierarchy class 23 is set to equal a large hierarchy class 22, such as corresponding to high throughput long-distance roads such as highways or freeways, for example a hierarchy class value=7. Then, for example, all road segments having a hierarchy class smaller or equal to the threshold hierarchy class 23 can be discarded, for example in the present example those road segments having a hierarchy class value of 1-7. In other words, for areas where the weighting factor 30 is small, a comparatively larger portion of the road segments 3, 3a-3j are discarded, such as those road segments corresponding to local or feeder roads.

Respectively, in areas where the weighting factor 30 is large (in FIG. 6 on the right-hand side), the threshold hierarchy class 23 is set to a smaller value of the hierarchy classes 22, for example a value=2. Then, a comparably smaller fraction of the road segments 3, 3a-3j is selectively discarded, such as those road segments having a hierarchy class 22 smaller than the threshold hierarchy class 23, for example, in the present example, those road segments having a hierarchy class value of 1 or 2.

With reference to the FIGS. 4, 5, and 6, an effect of such selective discarding based on the hierarchy class 22 and the weighting factor 30 is explained in greater detail. Namely, in those areas being close to the approximated cruising range 10 and/or being close to the current location 1 and/or having a large relative elevation 21 with respect to the current location 1, the criterion for selectively discarding, such as, the threshold hierarchy class 23, is set to a more strict value. In other words, only a smaller part of the road segments 3, 3a-3j may be discarded. In the other areas, a larger portion of the road segments 3, 3a-3j can be selectively discarded because the threshold hierarchy class 23 has a larger value.

Close to the current location, a high accuracy in the road segment network, such as a small amount of selectively discarded road segments 3, 3a-3j, may be desired in order to provide a correct road network search for local roads and feeder roads in the vicinity of the vehicle. For example, in order to reach a high hierarchy road, for example a highway, it may be necessary to include the local and feeder roads in the vicinity of the current location 1 in the performance of the road network search.

Respectively, in the vicinity of the approximated cruising range 10, it may be desired to thin out the road segment network only to a smaller degree, such as selectively discarding only a smaller portion of the road segments 3, 3a-3j. Namely, in the area where it is approximately estimated that the amount of available fuel or energy of the vehicle runs low, a large accuracy in the road network search and the subsequent estimating of the cruising range may be desired.

Likewise, in those geographical areas having a comparably large elevation difference 21 with respect to the current location 1 of the vehicle 100, it may be desirable to perform the road network search using a dense road segment network, such as by not selectively discarding a large portion of the road segments 3, 3a-3j. Because the amount of fuel or energy necessary in order to overcome the height difference 21 to reach such areas is comparably large, it may be desired to base the road network search on the subsequent estimation of the cruising range on a highly accurate road segment network comprising a larger number of road segments 3, 3a-3j. In such areas, a large weighting factor 30 may be desired.

Figure 7:
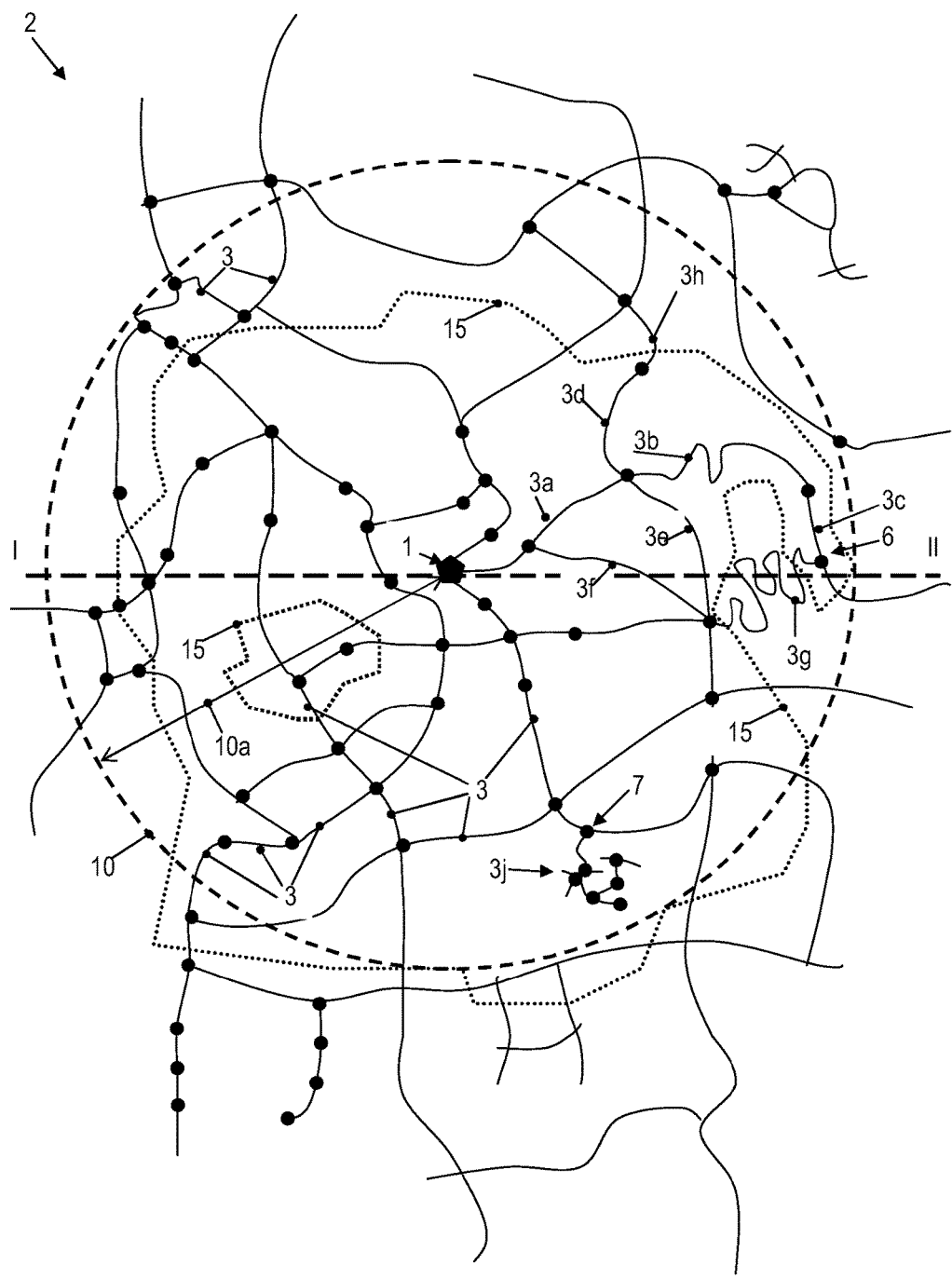
FIG. 7 illustrates an example of a road network search by expanding route links based on a set of road segments from which road segments have been selectively discarded based on the weighting factor.

In FIG. 7, an example of the digital map data 2 is depicted in a map view corresponding to the map view of FIG. 3. However, the road segment network has been thinned out according to the techniques as set forth above with respect to FIGS. 4, 5, 6. In other words, the road segments 3, 3a-3j have been subject to selective discarding based on the associated hierarchy class 22 and based on the associated weighting factor 30. As can be seen from comparison of FIGS. 3 and 7, a number of road segments 3*i* have been selectively discarded from the road segment network. This is because these road segments 3*i* are associated with a comparably small weighting factor as they have an intermediate distance between the approximate cruising range 10 and the current location 1. Moreover, the road segments 3*i* in this example are situated in an area having a small relative elevation difference 21 with respect to the current location 1 of the vehicle 100. Also, the road segments 3*i* have a small hierarchy class. Due to the combination of a small weighting factor and a small hierarchy class, as illustrated in FIG. 6, the road segments 3*i* are discarded.

However, the road segments 3*j* have not been selectively discarded. The road segments 3*j* also have a small hierarchy class, such as the same hierarchy class as the road segments 3*i*. However, the road segments 3*j* are in close vicinity of a certain location 7. The certain location 7 is relevant for the vehicle navigation, such as by corresponding to a site where traffic obstruction has been reported, where a detour is likely to occur, where a waypoint of a previously planned route is located, where a point of interest is located, or the like. It is possible that the weighting factor 30 is further determined as being dependent on the distance to the certain location 7. Because the distance for the specific road segment 3*j* to the certain location 7 is comparably small, the weighting factor 30 may be comparably large. Therefore, the threshold hierarchy class 23 may be set to equal a low hierarchy class 22. Since the road segments 3*j* have a hierarchy class larger than this particular hierarchy class threshold 23, they are not discarded.

Referring to FIG. 6, other conceivable scenarios relate to situations where the road segments 3*j* are situated close to the estimated cruising range 10, are situated in the vicinity of the current location 1, or have a large elevation difference 21 with respect to the current location 1. Also in such scenarios, the threshold hierarchy class 23 associated with the road segments 3*j* can be comparably small, thereby potentially resulting in not discarding the road segments 3*j*.

It should be understood that the computational efforts needed to perform the road network search correlate with the number of road segments in the considered set of road segments. Therefore, when a reduction of the computational efforts is desired, in general, either the weighting factor 30 may be shifted to lower values or the dependency as depicted in FIG. 6 may be altered such that for a given weighting factor 30 more road segments are discarded. It is also possible to adapt the dependencies of Equation 1.

In FIG. 7, the estimated cruising range 15 is depicted as a dotted line. The estimated cruising range 15 is shown as a range polygon. As can be seen from FIG. 7, in some parts the estimated cruising range 15 has a smaller distance to the current location 1 than the approximated cruising range 10, whereas in other parts the estimated cruising range 15 has a larger distance to the current location 1. This is because the estimated cruising range 15 can be considered to be more accurate than the approximated cruising range 10 which may be a rough approximation.

In particular, in the hilly region around the road segments 3*b*, 3*g*, 3*e*, 3*c*, a high spatial resolution of the estimated cruising range 15 is achieved due to comparably few discarded road segments. In particular, the target location 6 is estimated as being reachable via a path along the road segments 3*a*, 3*b*, 3*c*—but not reachable via a path along the road segments 3*a*, 3*e*, 3*g* or 3*f*, 3*g*. For example the road segment 3*g* can be a mountain pass road, while the target location 6 is located in a valley behind the mountain pass road.

For example, the road segments 3*a*, 3*b*, 3*c* may have a smaller hierarchy class than the road segments 3*f*, 3*g*. Therefore, a conventional road network search being based on costs associated with travel time or distance would yield a shortest and/or quickest route to the target 6 along the road segments 3*f*, 3*g*. If the selective discarding of the road segments 3, 3*a*-3*j* occurred based on the hierarchy class 22 only, for example the road segment 3*b* would have been discarded. In such a case the target location 6 would have been established as not being reachable because the energy consumption for travelling along the mountain path road of the road segment 3 *g* would have been projected as being larger than the amount of available fuel or energy. By selectively discarding also based on the weighting factor 30, the road segment 3*b* has not been discarded, therefore allowing a more accurate determining of the approximate cruising range 15 showing that a circumvention of the mountain pass road 3*g* by means of the road segment 3*b* allows the vehicle to reach the target 6.

Furthermore, visible in the lower left part of FIG. 7, is an island-type portion of the cruising range 15. All areas around that portion of the cruising range 15 are estimated to be reachable. Such a scenario may occur when the respective island-type portion is a hilly region with larger elevation than the surrounding area, such as corresponding to an elevated plain, hilltop, or other elevated feature.

Figure 8:
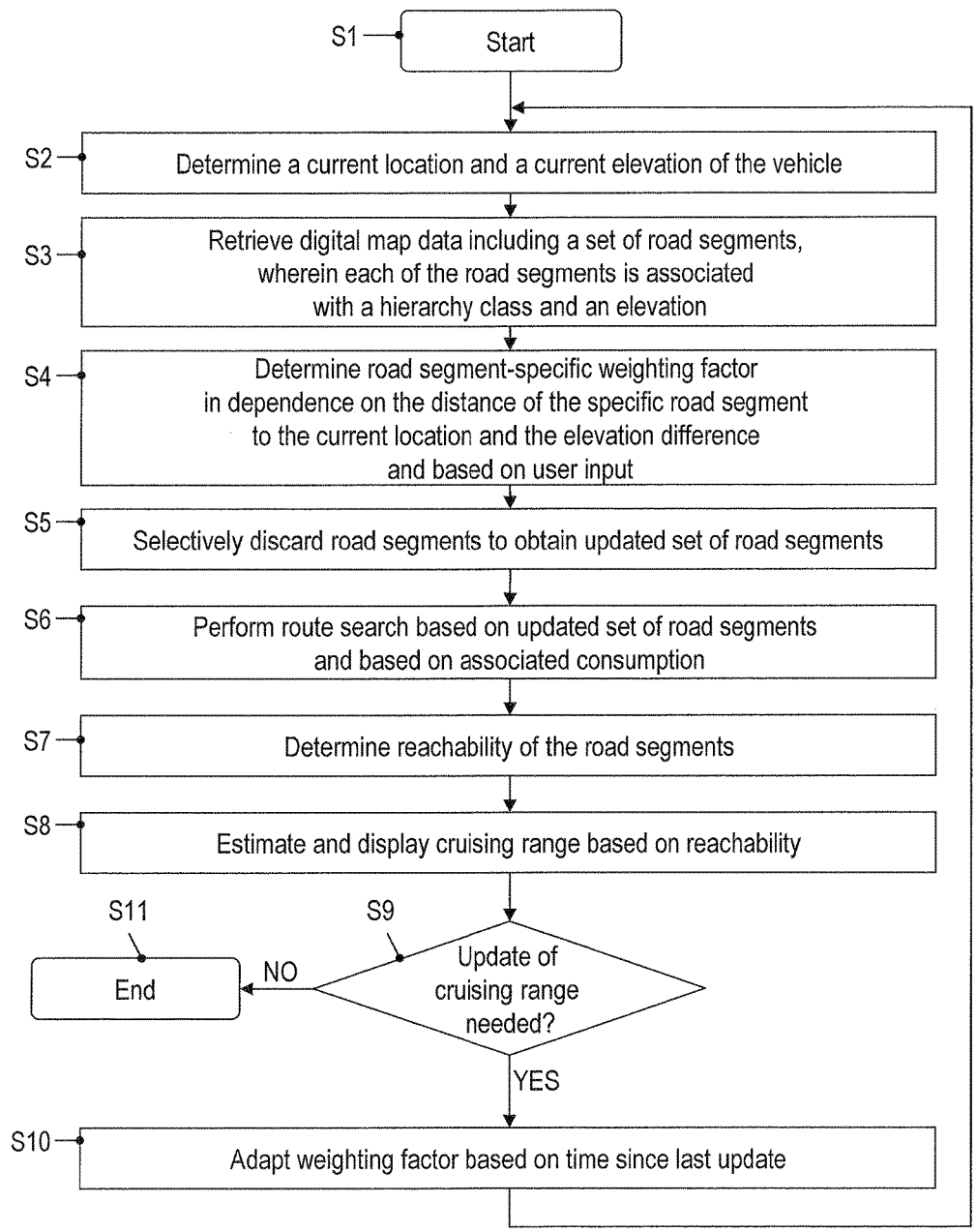
FIG. 8 is a flowchart example of a method of estimating a cruising range.

FIG. 8 is a flowchart illustrating an example operational method of the navigation system to estimate a cruising range. The operation starts with step S1. In step S2 the current location 1 and the current elevation of the vehicle 100 are determined by the navigation system. In step S3, the digital map data 2 including a set of road segments 3, 3*a*-3*j* is retrieved, for example from the storage unit 103. Each of the road segments is associated with a respective value of the hierarchy classes 22 and the elevation 20, such as in a data base. Appropriate databases and associated data formats are known to the skilled person. Also the elevation of the vehicle 100 may be determined based on the digital map data 2.

In step S4, the weighting factor 30 is determined for each of the road segments 3, 3*a*-3*j* in dependence on the distance 1*a* of the specific road segments for which the weighting factor 30 is determined to the current location 1, in dependence on the elevation difference 21 between the specific road segment and the current location 1, and based on user input. For example, the user input can be received via the user interface 100 of the system 200. For example, if a user zooms in within a map view based on the digital map data 2, for the magnified region of the map view, the weighting factor 30 may be increased. It is also possible that the user may specify an overall accuracy of the cruising range estimation resulting in a shift of the weighting factor 30 towards higher or smaller values, respectively. It is not necessary to determine the weighting factor 30 in dependence on user input.

In step S5, the road segments 3, 3*a*-3*j* are selectively discarded to obtain an updated set of road segments. For example, step S5 can contain a threshold comparison between the hierarchy class 21 associated with each specific road segment and the threshold hierarchy class 23 which is determined based on the weighting factor 30 determined for the specific road segment in step S4. Reference is made to FIG. 6.

In step S6, the road network search is performed based on the updated set of road segments. The road network search considers costs for each of the road segments 3, 3a-3j when expanding route links. The costs may be associated with consumption of fuel or energy for travelling along the respective road segment. An abort criterion for the road network search may be provided. One such abort criterion may be defined based on the approximated cruising range 10. For example, if route links are expanded up to a certain distance with respect to the current location in relation to the approximated cruising range 10, the road network search may stop. It may also be possible to provide the abort criterion based on costs: for example the projected total fuel or energy consumption costs of the respective iteration step of the road network search may be compared with the available amount of fuel or energy. If the total costs amount to a particular fraction of the available amount, for example 80% or 100% or 105% or 120%, the road network search may terminate.

Various methods of performing the road network search may be used, including, for example, the Dijkstra algorithm or derived algorithms. In particular, such methods may correspond or may be closely related to a conventional route search. For example, such algorithms can output a shortest path tree, such as a graph constructed to contain cost optimized connections between a root node or road segment (here possible the current location) and all other nodes or road segments. The costs with respect to which the shortest path tree is optimized may refer to travel distance or travel time or fuel/energy consumption, or a combination thereof. The road network search yields, for each road segment of the updated set of road segments, a cost value corresponding to the projected consumption of fuel or energy necessary to reach the specific road segment, for example from the current location of step S1.

In step S7, by comparing this projected amount of fuel or energy necessary to reach each specific road segment with the amount of available fuel or energy, the reachability of the road segments of the updated set of road segments is determined. In other words, the reachability of a plurality of road segments is estimated.

In step S8, the cruising range 15 is estimated based on the reachability as determined in step S7. The cruising range 15 is derived from the reachability of the plurality of road segments. In one embodiment, the cruising range is defined by the borderline between the reachable road segments and the not-reachable road segments. However, postprocessing may occur in step S8 when estimating the cruising range. For example, a safety margin may be provided, for example road segments that are barely reachable, such as where the amount of available fuel/energy is projected to run low, may be excluded from the cruising range 15, for example by performing a threshold comparison. Furthermore, it may be possible to determine gas stations located close to the cruising range 15 and provide a user with a recommendation to fill up energy/fuel there.

In step S8 it may also be possible to consider offroad areas, such as areas of the digital map data where no road segment is present. For example, at a given location the cruising range may be limited by a dead end road. When reaching the end of this dead end road, a given amount of fuel or energy may be left. Then it may be possible to calculate the distance from the endpoint of this dead end road segment which can be travelled off-road before the fuel or energy is entirely consumed. This can occur, for example in a manner which is independent of the geographical direction and/or may consider height differences of the off-road terrain.

Furthermore, in step S8 the estimated cruising range may be optionally output, such as on a display and/or be part of a map view, to a user, such as a driver of a vehicle. This may allow the driver to determine how far he may travel without having to refuel and/or may allow the driver to plan the refueling locations.

In step S9, it is checked whether an update of the cruising range 15 is needed. Different criterions can be used in order to check whether an update of the estimated cruising range 15 as obtained in step S8 is needed. For example, the criterion may be the elapse of a time span. It may be possible to provide an update of the cruising range with a fixed or pre-determined repetition frequency. It is also possible that the cruising range is updated once the vehicle has travelled a predefined distance. It is also possible that the cruising range is updated based on a change in consumption parameters, for example an update may be based on a newly received traffic condition report.

If, in step S9, it is found that an updated cruising range is required, in step S10 the weighting factor 30 can be adapted based on the time since the last update. For example, if the time since the last update is very short, the weighting factor 30 can be adapted such that more road segments are selectively discarded, thereby reducing the amount of computational efforts necessary in order to perform the steps S6, S7 and S8. However, if the time since the last update is sufficiently large, the weighting factor 30 can be adapted such that the road segment network is thinned out to a smaller degree. It should be understood that rather than or in addition to adapting the weighting factor 30, the correlation between the weighting factor 30 and the threshold hierarchy class 23 as depicted in FIG. 6 can be adapted accordingly. It can also be possible that the strength of the dependencies of the distance 1A, the elevation difference 21, or the distance 10b on the weighting factor 30 as specified via the parameters a, b, c in the Equation 1 is altered. In such a case, the thinning out of the road segment network may be restricted to a smaller geographical area or a distance to the current location 1 for which road segments of a given hierarchy class are selectively discarded may be decreased. Also in such a way the number of road segments considered for the road network search may be reduced, thereby reducing the computational efforts needed for updating the estimated cruising range.

After step S10, the steps S2-S8 can be performed again.

If, in step S9, it is determined that an update of the cruising range is not needed, the operation ends in step S11.

Figure 9:
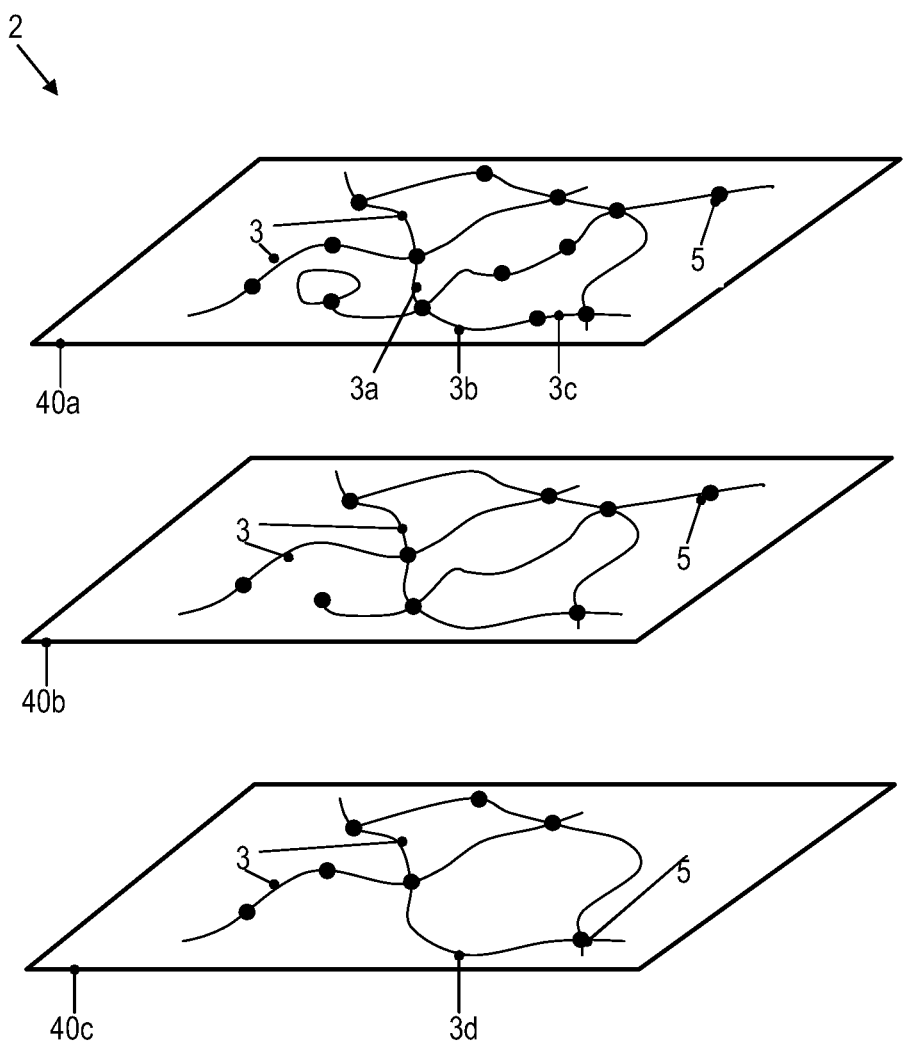
FIG. 9 illustrates an example of selective discarding of road segments for hierarchy classes derived from a hierarchical network of a digital map database.

In FIG. 9, an alternative example for the hierarchy class 22 and the selectively discarding of the road segments is illustrated. In FIG. 9 three layers 40a, 40b, 40c of a hierarchical network, such as from a hierarchical database are depicted. The layers 40a, 40b, 40c correspond to different levels of abstraction/detail of the road network. The first layer 40a corresponds to the digital map data 2 having the most detailed, such as the most highly resolved, representation of the road network, such that local roads are contained. A high spatial resolution of the road segments is obtained by providing a large amount of nodes 5, such as a large number of road segments 3. The second layer 40b contains fewer road segments 3. Also, some roads are represented using a smaller amount of nodes. In other words, the spatial resolution or detail level can be reduced by providing a smaller number of road segments 3. In this regard, the third layer 40c corresponds to the largest degree of abstraction, such as a lowest level of detail. A large amount of road segments 3 are removed from the third layer 40c. Those roads being represented by the third layer 40c comprise a comparably fewer number of nodes 5 and therefore road segments 3: in other words, for a connection between a starting point and an end point, the first layer 40*a*, for example uses three connected road segments 3*a*, 3*b*, 3*c*, while the third layer 40*c* uses a single road segment 3*d*.

In such a scenario, it is possible that the digital map data 2 is retrieved where the hierarchy class 22 of each road segment is derived from information corresponding to the association with the layers 40*a*, 40*b*, 40*c*. The selective discarding of the road segments from the set of road segments can be based on the hierarchy class 22 and can correspond to discarding those road segments belonging to those of the layers 40*a*, 40*b*, 40*c* having a lower degree of abstraction, such as having a higher spatial resolution and/or a higher level of detail. For example, the threshold hierarchy class 23 can specify a given one of the layers 40*a*, 40*b*, 40*c*. Then all road segments 3 not belonging to the given layer may be discarded. Also, it may be possible to discard all those road segments 3 which belong to a layer corresponding to a lower level of abstraction/higher level of detail than the given layer. Alternative examples are conceivable.

Although the invention has been shown and described with respect to certain examples, equivalents and modifications will occur to others skilled in the art upon reading and understanding the specification. The present invention includes all such equivalents and modifications and is limited only by the scope of the appended claims. For example, as the FIGS. 4-6 make reference to particular dependencies of the weighting factor 30 on the various parameters, as well as particular dependencies of the threshold hierarchy class 23 on the weighting factor 30, different dependencies both quantitatively as well as qualitatively are conceivable. These embodiments are not construed as being limited. Furthermore, the road network search has been discussed predominantly with respect to road segments costs being associated with fuel/energy consumption for travelling along the road segments. However, it should be understood that any other costs may be employed, for example travel time or travel distance or a combination thereof.

We claim:

1. A method of performing a road network search for vehicle navigation of a vehicle, the method comprising:
   determining a current location of the vehicle using a navigation system;
   the navigation system retrieving digital map data in a vicinity of the current location, the digital map data including a set of road segments, each being associated with a hierarchy class and an elevation;
   the navigation system calculating a road segment-specific weighting factor for road segments included in the set of road segments, the calculation by the navigation system of the weighting factor using a distance between a specific road segment and the current location, and an elevation of the specific road segment, wherein calculating the road segment-specific weighting factor for the specific road segment comprises:
      the navigation system determining the road segment-specific weighting factor has a same sign of dependency compared to a road segment-specific weighting factor determined for a reference road segment in response to:
         the specific road segment having a smaller distance to the current location than the reference road segment, and
         the specific road segment having a larger positive elevation difference with respect to the current location than the reference road segment;
   the navigation system selectively discarding the road segments from the set of road segments, based on the road segment-specific weighting factor and the associated hierarchy class, to obtain an updated set of road segments; and
   the navigation system performing the road network search by expanding route links based on the updated set of road segments.

2. The method of claim 1, further comprising:
   the navigation system determining an approximate cruising range;
   the navigation system determining a set of geographical locations based on the approximate cruising range; and
   calculating the road segment-specific weighting factor further comprises the navigation system using a distance of the specific road segment to the set of geographical locations to calculate the road segment-specific weighting factor.

3. The method of claim 1, further comprising retrieving the digital map data from a digital map database, the digital map database comprising a hierarchical network wherein different layers corresponding to at least one of different levels of abstraction or different levels of detail of the road segments, and wherein a hierarchy class of the specific road segment is derived from a hierarchy of a layer of the hierarchical network which the specific road segment is included in.

4. The method of claim 1, further comprising:
   determining a certain location as being relevant for the vehicle navigation; and
   calculating the road segment-specific weighting factor further comprises the navigation system using a distance of the specific road segment to the certain location to calculate the road segment-specific weighting factor.

5. The method of claim 1, further comprising:
   determining a current elevation of the vehicle with the navigation system; and
   calculating the road segment-specific weighting factor further comprises the navigation system using a relative elevation difference of an elevation of the specific road segment with respect to the current elevation.

6. The method of claim 1, wherein selectively discarding the road segments from the set of road segments comprises identifying road segments from the set of road segments that are associated with a hierarchy class corresponding to at least one of a smaller travel velocity, a smaller traffic capacity, or a reduced through traffic relative to a threshold hierarchy class; and discarding the identified road segments.

7. The method of claim 6, further comprising determining with the navigation system the threshold hierarchy class using the road segment-specific weighting factor.

8. The method of claim 1, wherein calculating the road segment-specific weighting factor for the specific road segment comprises: the navigation system determining the road segment-specific weighting factor has the same sign of dependency compared to the road segment-specific weighting factor determined for the reference road segment additionally in response to:
   the specific road segment having a smaller distance to a certain location than the reference road segment, the certain location being relevant to the vehicle navigation; and
   the specific road segment having a smaller distance to a set of geographical locations than the reference road segment, the set of geographical locations determined by the navigation system based on an approximate cruising range of the vehicle.

9. A method of estimating a cruising range of a vehicle, the method comprising:
determining a current location of the vehicle using a navigation system;
the navigation system retrieving digital map data in a vicinity of the current location, the digital map data including a set of road segments;
the navigation system calculating a road segment-specific weighting factor for road segments included in the set of road segments based on a distance between a specific road segment and the current location, and on an elevation of the specific road segment with respect to the current location;
the navigation system selectively discarding road segments from the set of road segments based on the road segment-specific weighting factor to obtain an updated set of road segments;
the navigation system performing a road network search with the navigation system, wherein the road network search expands route links included in the updated road segments based on an associated projected energy consumption of the vehicle travelling along the route links; and
determining with the navigation system a reachability of a plurality of road segments included among the updated set of road segments based on an available energy and the projected energy consumption necessary to reach each road segment of the updated set of road segments along the expanded route links;
wherein for a given road segment of the plurality of road segments for which the road network search expands a plurality of oriented route links, the navigation system determining the oriented route links are not reachable if all expanded route links are not reachable.

10. The method of claim 9, wherein each road segment of the plurality of road segments is associated with a hierarchy class and an elevation.

11. The method of claim 10, wherein the navigation system selectively discarding road segments comprises selectively discarding road segments also based on the hierarchy class associated with each of the respective road segments.

12. The method of claim 9, further comprising estimating a cruising range of the vehicle with the navigation system based on the determined reachability of the plurality of road segments.

13. A system for estimating a cruising range of a vehicle, the system comprising:
a memory storing a positioning unit, a storage unit, and a navigation unit; and
a processor coupled to the memory, wherein, when executed by the processor:
the positioning unit configures the processor to determine a current location;
the storage unit configures the processor to store digital map data in a vicinity of the current location, the digital map data including a set of road segments, each road segment being associated with a hierarchy class and an elevation;
the navigation unit configures the processor to:
retrieve the digital map data from the storage unit;
calculate a road segment-specific weighting factor for each of the road segments, the road segment-specific weighting factor being calculated based on a distance from a specific road segment to the current location, and based on the elevation of the specific road segment;
selectively discard road segments from the set of road segments, based on the road segment-specific weighting factor and the associated hierarchy class, to obtain an updated set of road segments;
perform a road network search by expansion of route links based on the updated set of road segments, wherein the road network search expands the route links based on an associated projected energy consumption of the vehicle travelling along the route link;
determine a reachability of a plurality of road segments based on an available energy and the energy consumption necessary to reach each road segment of the plurality of road segments along the expanded route links;
estimate the cruising range of the vehicle based on the determined reachability of the plurality of road segments; and
update the estimate of the cruising range based on predefined conditions, wherein the road segment-specific weighting factor is calculated dependent on a time period between two subsequent updates of the estimate of the cruising range.

14. The system of claim 13, further comprising a user interface, wherein the navigation unit further configures the processor to determine the road segment-specific weighting factor dependent on a user input received from the user interface.

15. The system of claim 13, wherein the route links are bidirectional or unidirectional links positioned between nodes of the road segments, and the navigation unit further configures the processor to expand the route links based on at least one of an associated travel time, travel distance, or energy consumption of the vehicle travelling along the route links.

16. The system of claim 13, wherein the navigation unit further configures the processor to selectively discard road segments having a low probability of being contained in long distance routes based on the road hierarchy classes and the elevation of the road segment.

* * * * *